Aug. 17, 1965  L. J. MORIN  3,200,957
DISPLAYING MEAT FOR SELF-SERVICE
Filed June 15, 1964
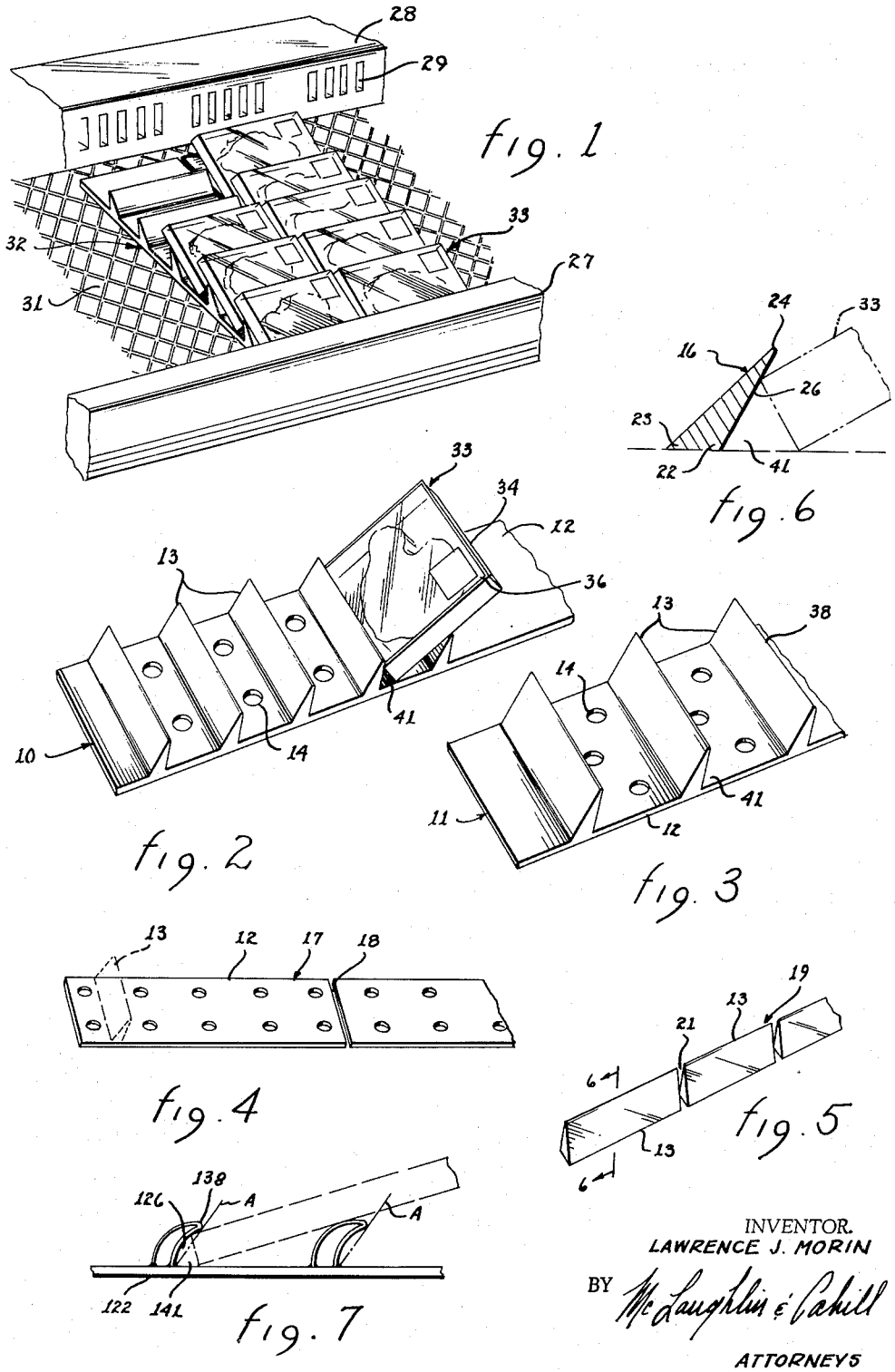
INVENTOR.
LAWRENCE J. MORIN
BY *McLaughlin & Cahill*
ATTORNEYS

United States Patent Office 3,200,957
Patented Aug. 17, 1965

3,200,957
DISPLAYING MEAT FOR SELF-SERVICE
Lawrence J. Morin, P.O. Box 1284, Sierra Vista, Ariz.
Filed June 15, 1964, Ser. No. 375,281
5 Claims. (Cl. 211—1)

The present application is a continuation-in-part of my prior copending application, Serial No. 114,201, filed June 1, 1961.

My invention relates to an improved method of and means for displaying meat for self-service.

It has become a common practice to package cuts of meat and to mark the package with a label showing the particular cut of meat displayed, its weight, its price per pound, and total price for the entire package. Such packages are commonly placed together in an open-top refrigerated food counter for display and access in self-service establishments. There are several disadvantages in the manner of displaying meats for self-service, all of which are very well known to those skilled in the art. One problem is that the temperature of the meat will vary greatly because of the differential movement of cooling air, depending on whether the meat is stacked up relatively thickly or scattered loosely over the top of the grill support usually employed. When meat is placed on such counter in such a way as to permit free air movement, customers will frequently so handle the meat packages as to spread them out and substantially completely prevent air movement past them. This problem is aggravated also by the fact that the meat packages are not all displayed so that the price information and the like are available and so that the appearance of the meat can also be abused. Customers, therefore, will frequently pick up one meat package after another and throw them down haphazardly. Since various cuts of meat are also frequently shown side by side, handling of the meat in the manner described by the purchasing public results in mixing up the various cuts, grades or the like of meat or sizes of packages so that still greater handling of the meat packages is necessary before the desired package is found. Repeated rearrangement of the display is necessary by market personnel as a consequence, but notwithstanding this fact, meat display repeatedly fails in its purpose.

The principal logic of the present invention is the provision of an improved method of and means for displaying meat for self-service in establishments such as supermarkets or the like.

Another object is to display pre-packaged meats in such a way that uniform cooling of the meats will always take place, and the character of the particular meat and all pricing information will always be available to the purchasing public without the necessity of repeatedly handling the same.

Still another object is the provision of a meat display for self-service in which the meat package will always be returned by the customer to its original position in the event the customer should pick the package up for inspection.

A further object is the provision of an improved display rack adapted to form a part of the display and support for meats in a conventional type of open refrigerated cabinet arranged for self-service.

Other objects and features of the invention will be apparent from the following detailed description taken from the accompanying drawings wherein FIG. 1 is a fragmentary view showing a part of an open refrigerated type cabinet or counter with the meat displayed on display racks used in accordance with the present invention;

FIG. 2 is a perspective view showing one form of rack and indicating the manner in which the packages are disposed thereon for display and for simple removal by customer without disturbing other packages which are also on display on the same rack;

FIG. 3 shows a modified form of display rack;

FIG. 4 shows the manner in which the base section of the rack is produced in a preferred manner such as by extrusion;

FIG. 5 indicates the manner of producing the meat supporting cleats,

FIG. 6 is an enlarged sectional view taken through the line 6—6 of FIG. 5, the figure showing in broken lines the relative position of the base panel and meat package which is being supported, and FIG. 7 is a fragmentary elevational view showing a modification.

Referring now first to FIGS. 2 through 6 the display rack of my present invention may have various forms including one form indicated generally by the reference character 10 in FIG. 2 and another form represented generally by the reference character 11 in FIG. 3. Each of these forms includes a base panel 12 formed of suitable material with a plurality of transverse cleats 13 and a plurality of apertures 14 shown in the form of round O's. In cross section the cleats 13 are such shape that they define an obtuse angle as indicated by the reference character 16 in FIG. 6.

While the display racks of the present invention may be formed in various ways of various materials, I have obtained very good results by the use of plastic, forming the parts by means of extrusion as indicated in FIGS. 4 and 5. It appears clear in FIG. 4 a continuous extrusion 17 is produced having the same cross section as the base panel 12, so that when the extrusion is cut as at 18 to a desired length, a suitable base panel 12 will be formed. The back is completed by securing, preferably by plastic welding, a suitable number of cleats 13 to the base panel. As FIG. 5 shows the cleats are formed from an extrusion indicated generally by the reference character 19, so that when this extrusion has been cut into pieces as indicated by the kurfs 21 in FIG. 5 the resulting cut pieces will comprise cleats 13.

In the drawings I show the base panel as of generally rectangular cross section with the cleats 13 secured to the top face thereof in spaced relation to each other to complete the final design. Though the invention may take various forms, I shall provide illustrative details for the benefit of those skilled in the art.

The width of the panel 12 and the rack itself is preferably of the order of 5½" to 6". Generally, it will be slightly narrower than the meat package, so that while the rack supports the meat package firmly, it itself will be visible only slightly. The meat package preferably will slightly overlap ends of the cleats. As pointed out the cross section of the cleats as shown in FIG. 6 defines an obtuse angle at 22, so that, considering the fact a triangle has three angles totaling 180°, the angles 23 and 24 will necessarily be acute angles, and the face 26 will slope backwardly with respect to the base panel 12 to form an undercut like structure. I have found that an overall height of the cleats of 1⅛" is satisfactory, although this height may vary to some extent. The extruded cleat stock is cut to have the same length as the width of the base panel 12, so that if 5½" is the standard, the cleat stock will also be cut to 5½" lengths.

Normally, the refrigeration cabinet for displaying meats for self-service has a shallow front partition 27 and a back partition 28 provided with a vertical grill 29 through which refrigerated air issues and descends down through a flat grill-like support 31 on which the meat-loaded rack indicated generally by the reference character 32 is supported. Refrigeration counters or cabinets of this type are normally completely open at the top, although they may have other constructions, and the customer leans over the front partition 27 to reach the packaged meat. Conventionally, the meat on display is arranged in accordance with many schemes, but when employing the invention comprising the display rack of my invention it is preferred that the meat be arranged in parallel lines running away from the customer. This means that the base of the rack will be closed to the customer, and the top of the rack furthest away from the customer. Depending upon the specific construction of the display rack, I may provide an overall length of, for example, 26", 28", 30" and 32", although these lengths may vary if other types of cabinets or counters are provided. The cleats are cemented or plastic welded to the base section at equal intervals and they may be on any desired centers, although I have found that a combination of say 3" centers, 2½" centers, 2" centers and possibly sometimes 1¾" centers are satisfactory for most types of meats. Utilizing the two extrusions of the general type shown in FIGS. 4 and 5, these dimensions provide quite a number of different racks for different meat displays.

While the meat displayed for self-service on a rack combination such as disclosed may be packaged in various ways, a suitable arrangement is to provide an overall package indicated generally by the reference character 33 in which a shallow paper box 34 acts as a tray or support for the meat, and the meat is retained in the shallow box and left open for display by providing a wrapping 36 entirely around the shallow box 34 and around the meat itself. A label 37 is suitably placed, preferably within the clear plastic wrapper 36 and preferably in the upper righthand corner as shown in FIG. 1 or at least in such a position that when a plurality of packages are supported on the rack as shown in FIG. 1 all of the labels will be visible to the customer. The label will normally identify the cut of meat, the price per pound, weight of cut and the overall price.

As FIG. 2 shows (see FIG. 6 also), the bottom edge of the meat package engages against the surface 16 and the top of the meat package engages against the top edge or apex 38 of the cleat. Thus, while the meat packages appear almost to lean on each other, and may in fact touch lightly, they are individually supported and one package can be removed without disturbing the others. The rack is designed so that the spacing and height of the cleats will support the packages in the manner shown, the spacing being somewhat different for different thicknesses of packages, and support a maximum number of packages almost as if they were resting on each other, but without actually having the weight of one package supported on the other package. This, as stated, permits each package to be withdrawn leaving the remaining part of the display intact, and if desired the package can as readily be returned if the purchaser desires not to select it.

While the rack may be formed of any suitable type of material, it should comprise a material having low heat conductivity and suitably a plastic. Very good results are obtained when a clear plastic is used, the transparent plastic wrapping on the meat and the clear plastic leaving the impression that the meat is supported entirely alone without the intervention of contaminating structure of any kind.

It will be noted that by facing the rack in the manner shown in the drawings, the obtuse angles 22 are not only all in the same direction, but the cleat 13 and base panel 12 together define an acute angle 41 providing an anchorage or recess which will hold the meat packages in position even though the top extending part of the package should be heavier than the part below the apex 38.

FIG. 7 shows a modification in which the extruded cleat 113 has its apex 138 facing rearwardly by the provision of a curved surface. It will be noted that while the angle 122 may be a right angle rather than an obtuse angle, the angle 141 formed by the straight line A is a virtual obtuse angle and the form shown in FIG. 7 functions or does the first described embodiment. Looking at this form, also, it is apparent that while the apex of the cleat is preferably relatively acute in shape, it may be rounded without loss of function should there be any apparent advantage in doing so. Thus in both forms, the meat packages, while apparently leaning one on another, are functionally separable being supported substantially entirely by the rack, and in such a way as to provide for free passage of cooling air entirely around each individual package.

With respect to both the base panel and cleats, solid sections are shown for purposes of illustration. It should be borne in mind, however, that open, hollow, fluted and the like cross sections may be used to provide for both lightness and strength. When expensive plastic materials are used, the saving in materials may also be of importance.

I have disclosed my invention in detail in the drawings and in the specification so that those skilled in the art may understand the manner of practicing the same. The scope of the invention is defined by the claims.

I claim:

1. In a refrigerated open cabinet for the self-service display of meat, including a base grill for passage of cooling air,
   (a) a meat display rack of elongated generally rectangular cross section, said display rack having
   (b) an apertured base section, and
   (c) a plurality of transverse upstanding spaced cleats supported by said base section;
   (d) said display rack adapted to support a plurality of meat packages of generally uniform size in overlapping relation to display as a part of each meat package a label containing pricing and the like data,
   (e) each such cleat having a surface defining an acute angle with said base section for supporting a bottom portion of the meat package, and a top edge holding the meat package in sloping relation above the rack.

2. A meat display rack combination as defined in claim 1 wherein said base section comprises a rectangular panel of plastic material and said cleats have an obtuse angular cross section, said apertures in the base section disposed between said cleats.

3. A meat display rack combination as defined in claim 1 wherein said base section comprises a rectangular panel of plastic material and said cleats comprise plastic extrusions and have an obtuse angular cross section, said cleats plastic welded to said base section with the said obtuse angle positioned to face said bottom portion of the meat package.

4. A meat display rack combination as defined in claim 1 wherein said meat package includes a transparent plastic membrane covering said meat in said package, and wherein said display rack comprises a transparent plastic body.

5. A meat display rack comprising
   (a) a generally rectangular base panel, and
   (b) a plurality of substantially equally spaced cleats supported on said panel, (c) each such cleat being of generally triangular cross section with its base engaging the panel,
(d) each such cleat having an apex, and defining with the panel one obtuse angle and one functionally obtuse angle creating an overhang portion,
(e) meat packages adapted to have a bottom edge resting on the panel and beneath said overhang, with an intermediate portion of the package engaging said apex,
(f) said panel provided with apertures between said cleats to permit cooling air to pass entirely around the meat package when it is so supported.

References Cited by the Examiner
UNITED STATES PATENTS

| | | | |
|---|---|---|---|
| 1,609,945 | 12/26 | Hermani | 211—135 |
| 1,659,509 | 2/28 | Ashbrook | 211—50 |
| 1,808,443 | 6/31 | Whitcher | 62—255 |

CLAUDE A. LE ROY, *Primary Examiner.*